United States Patent
Hofmeister et al.

(10) Patent No.: US 7,257,583 B2
(45) Date of Patent: Aug. 14, 2007

(54) SYSTEM AND METHOD FOR UPDATING AN ON-DEVICE APPLICATION CATALOG IN A MOBILE DEVICE RECEIVING A PUSH MESSAGE FROM A CATALOG SERVER INDICATING AVAILABILITY OF AN APPLICATION FOR DOWNLOAD

(75) Inventors: Nick Hofmeister, Seattle, WA (US); Ryan Waite, Seattle, WA (US); Ori Amiga, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 10/754,878

(22) Filed: Jan. 9, 2004

(65) Prior Publication Data

US 2005/0154759 A1  Jul. 14, 2005

(51) Int. Cl.
G06F 17/30 (2006.01)
G06F 17/00 (2006.01)
G06F 15/16 (2006.01)
G06F 7/04 (2006.01)
H04M 11/00 (2006.01)

(52) U.S. Cl. .................. 707/10; 707/1; 707/104.1; 707/200; 709/229; 455/407; 726/3

(58) Field of Classification Search ............... 707/1–2, 707/6–7, 100, 102, 104.1, 200, 10; 709/245–246, 709/229; 726/3, 26; 455/412.1, 412.2, 418–420, 455/407–408, 450; 380/270; 463/42
See application file for complete search history.

(56) References Cited

U.S. PATENT DOCUMENTS 6,463,463 B1 * 10/2002 Godfrey et al. ............. 709/206

(Continued)

FOREIGN PATENT DOCUMENTS

CA  2511054  *  1/2006

(Continued)

OTHER PUBLICATIONS

Holland, O et al. "dynamic multi-user software downloads for terminal reconfiguration in 3Gnetworks", 4th international conference on 3G mobile communication technologies, 2003, pp. 109-113.*

(Continued)

Primary Examiner—Srirama Channavajjala
(74) Attorney, Agent, or Firm—Merchant & Gould P.C.

(57) ABSTRACT

Embodiments of the present invention relate to methods, systems, and computer-readable media for providing software applications to a mobile device. A server receives a request for an application identified in an application catalog stored on the server. A push message is generated based on the request for the application and containing data from the application catalog stored on the catalog server. The push message is sent to a mobile device designated in the request for the application. Responsive to receiving an acceptance of the push message from the mobile device, the application is sent to the mobile device. The mobile device receives and reads the push message. Responsive to acceptance of the push message, the application is requested and received from the catalog server. The application is installed the on-device application catalog is updated to indicate the availability of the application for execution on the mobile device.

15 Claims, 11 Drawing Sheets

U.S. PATENT DOCUMENTS

| | | | |
|---|---|---|---|
| 6,708,206 B1* | 3/2004 | Thrane et al. | 709/219 |
| 6,778,834 B2* | 8/2004 | Laitinen et al. | 455/450 |
| 6,789,081 B1* | 9/2004 | Vanska | 707/100 |
| 6,915,328 B2* | 7/2005 | Turnbull | 709/203 |
| 6,941,134 B2* | 9/2005 | White | 455/418 |
| 6,996,599 B1* | 2/2006 | Anders et al. | 709/201 |
| 7,013,290 B2* | 3/2006 | Ananian | 705/27 |
| 7,024,382 B2* | 4/2006 | Nelson | 705/27 |
| 7,065,559 B1* | 6/2006 | Weiss | 709/219 |
| 2002/0067716 A1* | 6/2002 | Zhang | 370/352 |
| 2002/0131404 A1* | 9/2002 | Mehta et al. | 370/352 |
| 2002/0142763 A1* | 10/2002 | Kolsky | 455/419 |
| 2002/0147769 A1* | 10/2002 | Levitan | 709/203 |
| 2002/0165024 A1* | 11/2002 | Puskala | 463/40 |
| 2003/0018714 A1* | 1/2003 | Mikhailov et al. | 709/203 |
| 2003/0065738 A1* | 4/2003 | Yang et al. | 709/215 |
| 2003/0184600 A1* | 10/2003 | Lin-Hendel | 345/853 |
| 2004/0054569 A1* | 3/2004 | Pombo et al. | 705/7 |
| 2004/0078395 A1* | 4/2004 | Rinkevich et al. | 707/201 |
| 2004/0116119 A1* | 6/2004 | Lewis et al. | 455/435.1 |
| 2004/0176080 A1* | 9/2004 | Chakravorty et al. | 455/414.1 |
| 2004/0205243 A1* | 10/2004 | Hurvig et al. | 709/245 |
| 2004/0205248 A1* | 10/2004 | Little et al. | 709/246 |
| 2004/0259577 A1* | 12/2004 | Ackley | 455/466 |
| 2004/0266370 A1* | 12/2004 | Ulrichsen | 455/123 |
| 2005/0108185 A1* | 5/2005 | East et al. | 707/1 |
| 2005/0172128 A1* | 8/2005 | Little et al. | 713/168 |

FOREIGN PATENT DOCUMENTS

| | | | | |
|---|---|---|---|---|
| CA | 2513014 | * | 1/2007 | 29/2 |
| EP | 1143679 | * | 10/2001 | 29/6 |
| EP | 1347623 | * | 9/2003 | 17/25 |
| EP | 1462938 | * | 9/2004 | 9/445 |
| EP | 1720323 | * | 11/2006 | 29/8 |
| EP | 1755352 | * | 2/2007 | 29/8 |
| GB | 2406244 | * | 3/2005 | 29/6 |
| WO | WO 2004/109510 | * | 12/2004 | 9/445 |
| WO | WO 2005/025252 | * | 3/2005 | 7/22 |
| WO | WO 2005/117469 | * | 12/2005 | 7/20 |
| WO | WO 2006/132763 | * | 12/2006 | |

OTHER PUBLICATIONS

Taconet,C et al. "context aware deployment for mobile users", proceedings in COMPSAC-2003 computer software and applications conference, 2003, pp. 74-81.*

Jaaksi,A ,"developing mobile browsers in a product line", Software, IEEE, Aug. 2002, vol. 19, issue 4; pp. 73-80.*

Jiannong Cao et al. "reliable message develivery for mobile agents: push or pull", proceedings, ninth international conference on parallel and distributed systems, 2002, pp. 314-320.*

U.S. Appl. No. 60/467,252, filed Apr. 30, 2003.*

Fred Christensen et al. "webSphere everyplace access: making a quantum leap in mobile computing". IBM Apr. 2003.*

Stockus A et al. "accessing to spatial data in mobile environment", proceedings of the seoond internatinal conference on web information systems engineering, 2001, vol. 2, pp. 57-65.*

Gamou, T, "a working set approach to reduce the download-execution time of mobile programs", $22^{nd}$ international conference on distributed computing systems, 2002 proceedings; 2002, pp. 239-248.*

Kotinik,B et al. "the design of mobile multimodal communication device-personal navigator", Internatinal conference on trends in communicatins, EUROCON, 2001, vol. 2, pp. 337-340.*

Guodong Zhang et al. "integrated multimedia personal communications with asymmetric services for mobile users in cellular systems", journal of parallel and distributed computing 60, 2000, pp. 353-373.*

"Balancing push and pull for data broadcast," by Acharya, S.; Franklin, M.; Zdonik, S., SIGMOD Record Conference title: SIGMOD Rec. (USA) vol. 26, No. 2, p. 183-94, May 13-15, 1997.

"Autonomous information provision to achieve reliability for users and providers," by Ahmad, H.F.; Guanghe Sun; Mori, K., Proceedings $5^{th}$ International Symposium on Autonomous Decentralized Systems, p. 65-72. Published: IEEE Comput. Soc., Los Alamitos, CA., Mar. 2001.

"Novel push-and pull-hybrid data broadcast scheme for wireless information networks," by Hu, Jian=Hao; Yeung, Kwan L.; Feng, Gang; Leung, K.F., 2000 IEEE International Conference on Communications v. 3 2000, p. 1778-1782.

"CQ: A personalized update monitoring toolkit," by Liu, Link; Pu, Calton; Tang, Wei; Butler, David; Biggs, John; Zhou, Tong; Benninghoff, Paul; Han, Wei; Yu, Fenghua, Proceedings of the ACM SIGMOD Conference, SIGMOD Record (ACM Special Interest Group on Management of Data), v 27 n 2, Jun. 1998. Croation Soc Ehm Eng., Zagreb, Croatia, p. 547-549.

"Dissemination of dynamic data on the Internet," by Ramamritham, K.; Deolasee, P.; Katkar, A.; Panchbudhe, A.; Shenoy, P., Databases in Networked Information Systems, International Workshop DNIS 2000. Proceedings (Lecture Notes in Computer Science vol. 1996), p. 173-87.

* cited by examiner

SYSTEM AND METHOD FOR UPDATING AN ON-DEVICE APPLICATION CATALOG IN A MOBILE DEVICE RECEIVING A PUSH MESSAGE FROM A CATALOG SERVER INDICATING AVAILABILITY OF AN APPLICATION FOR DOWNLOAD

TECHNICAL FIELD

The present invention relates generally to the field of computer software and more particularly to distributing software to one or more mobile computing device.

BACKGROUND OF THE INVENTION

A wide variety of mobile computing devices such as cellular telephones, pagers, Personal Digital Assistants (PDAs), and others are commonly in use. Software available for use on these mobile devices includes a wide range of applications such as games, phonebooks, calendars, email, web browsers, and others. These applications may be distributed preloaded on the mobile device. For example, a cellular telephone typically includes software for maintaining a phonebook. In other cases, the software may be installed on the device by the user after purchase of the mobile device.

Typically, to install software on a mobile device a user has two choices. First, the user may use a personal computer or other, similar computing device to locate and download some desired software. For example, the user may browse an online catalog of available applications and select one or more for download. Once the application is downloaded to the user's computer, the user then uses a docking cradle, cable, infrared beaming, a wireless network, or other means to connect the mobile device with the personal computer and synchronize or otherwise transfer the software from the personal computer to the mobile device. Finally, the user executes an installation or setup program on the mobile device to install the software and make it available for execution on the mobile device.

Alternatively, the mobile device may have browser software installed that allows the user to "surf" or browse one or more online catalogs for available software. This method requires the user to browse through a potentially large number of software selections, locate, and download a desired selection. Once the application has been downloaded, the user executes an installation or setup program on the mobile device.

However, both of these methods present similar problems. First, these methods are difficult to use and are time consuming. For example, browsing an online catalog is inherently very slow from a mobile device and hence frustrating for the user. Additionally, online catalogs are typically complex and therefore difficult to navigate. Once an application is located, downloads from online catalogs typically require more end-user interaction and are cumbersome overall. For example, using a desktop computer to locate, download, and install an application is time-consuming, cumbersome, and requires the user to be next to his PC with a connection to the mobile device.

Further, these methods do not provide a way in which a user of one mobile device can initiate a download to a different mobile device or even inform another device of available software. Therefore, if a user owns more than one mobile device and wishes to install the same software on each device, he must locate, download, and install the software for each mobile device separately. Similarly, there is no way for one user to conveniently inform another of available software that may be of interest to that user. It is with respect to these considerations and others that the present invention has been made.

SUMMARY OF THE INVENTION

In accordance with the present invention, the above and other problems are solved by methods and systems for providing software applications to a mobile device based on an application catalog on a catalog server. Generally, a catalog server, in response to some request for an application stored on an application server, generates a push message to one or more mobile devices. The push message contains data from the application catalog on the catalog server to inform the users of the mobile devices of the available software. If accepted, the application can be downloaded, i.e. pulled, from the application server and installed on the mobile device and an on-device application catalog can be updated to reflect the availability of that application for execution on the mobile device.

In accordance with other aspects, the present invention relates to a method of providing software applications to a mobile device. The method comprises receiving a request for an application identified in an application catalog stored on a catalog server. A push message is generated based on the request for the application and containing data from the application catalog stored on the catalog server. The push message is sent to a mobile device designated in the request for the application. Responsive to receiving an acceptance of the push message or a pull request from the mobile device, the application is sent to the mobile device.

In accordance with other aspects a method of updating an on-device application catalog in a mobile device comprises receiving a push message from a catalog server indicating availability of an application for download and containing information from an application catalog of the catalog server related to the application. The push message is read. Responsive to acceptance of the push message, the application is requested and received from an application server. The application is installed and the on-device application catalog is updated to indicate the availability of the application for execution on the mobile device.

In accordance with yet other aspects, the present invention relates to a system for providing software applications to a mobile device. The system comprises a processor and a memory coupled with and readable by the processor. The memory contains a series of instructions that, when executed by the processor, cause the processor to receive a request for an application identified in an application catalog stored on a catalog server. A push message is generated based on the request for the application and containing data from the application catalog stored on the catalog server. The push message is sent to a mobile device designated in the request for the application. Responsive to receiving an acceptance of the push message or a pull request from the mobile device, the application is sent to the mobile device.

In accordance with yet other aspects, the present invention relates to a mobile device for updating an on-device application catalog. The mobile device comprises a processor and a memory coupled with and readable by the processor. The memory contains a series of instructions that, when executed by the processor, cause the processor to receive a push message from a catalog server indicating availability of an application for download and containing information from an application catalog of the catalog server related to the application. The push message is read. Responsive to acceptance of the push message, the application is requested and received from an application server. The application is installed and the on-device application catalog is updated to indicate the availability of the application for execution on the mobile device.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
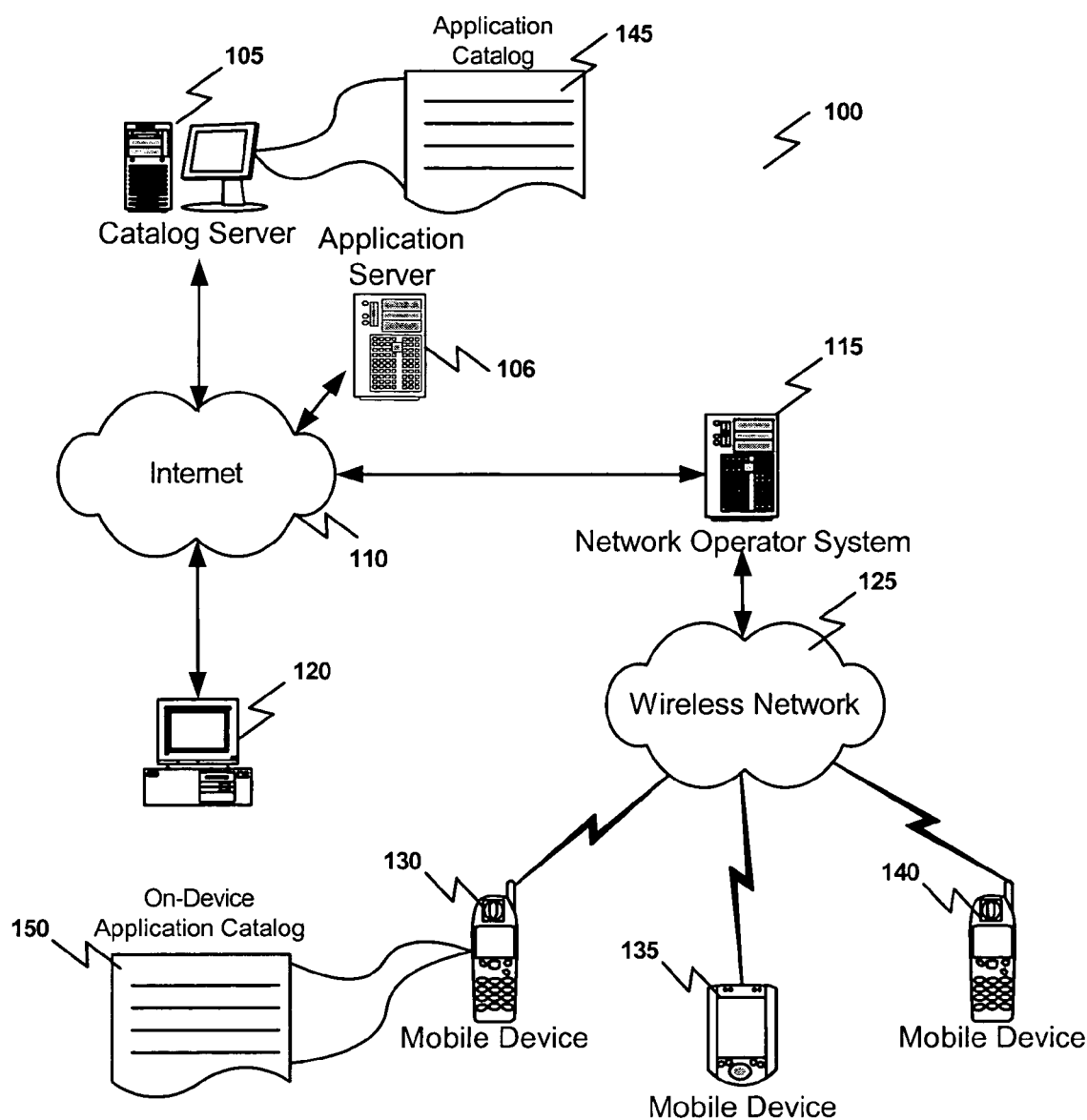
FIG. 1 illustrates at a high level a system for updating an on-device application catalog on a mobile device according to an embodiment of the present invention.

FIG. 1 illustrates at a high level a system for updating an on-device application catalog on a mobile device according to one embodiment of the present invention. This example shows a system 100 including a catalog server 105, an application server 106, a network operator system 115, a user's system 120, and a number of mobile devices 130-140.

The network operator system 115 maintains a wireless network 125 through which the mobile devices 130-140 may communicate. The mobile devices 130-140 may include cellular telephones, Personal Digital Assistants (PDAs), pagers, and other types of devices capable of communicating over a wireless network. Through the wireless network 125, the mobile devices 130-140 may communicate with one another.

Additionally, the network operator system 115 may provide access to other networks with which the mobile devices 130-140 may connect and communicate. For example, a network operator system 115 typically provides access to land based telephone systems (not shown here). In many cases, the network operator system 115 also provides a connection to the Internet 110. Through this connection, the mobile devices 130-140 may browse and access information available on servers connected with the Internet 105.

Through the network operator system 115, the mobile devices 130-140 may access a catalog server 105 connected with the Internet 110 that provides information about content that may include application software for use on the mobile devices 130-140. For example, the catalog server 105 may provide information describing applications such as games, organizers, databases, word processors, spreadsheets, etc as well as a variety of add-ons, upgrades, and other content. The applications or other content may be located on an application server 106. While shown as separate components here, the catalog server 105 and application server 106 may in practice be maintained by the same physical machine. The catalog server 105 and application server 106 may be maintained by the operator of the wireless network 125, by an Independent Software Vendor (ISV), or by some other third party. Additionally, while only one catalog server 105 and one application server 106 are illustrated here, any number of servers may be available.

In addition to making a number of application available for download, the catalog server 105 may maintain an application catalog 145 reflecting the applications that are currently available on that catalog server 105. The application catalog 145 may contain information relating to each application such as title, author, a brief description, reviews, cost, a thumbnail screenshot, etc. As will be seen below, this information is useful in selecting applications for download to the mobile devices 130-140.

Each mobile device 130-140 also maintains an on-device application catalog 150 that is similar to the application catalog 145 maintained by the catalog server 105. However, the on-device application catalog 150 reflects those application available on that mobile device.

A mobile device 130 may browse the application catalog 145 on the catalog server 105 and select one of the applications for download. The catalog server 105, upon receiving this request, may then, immediately or at a later time, request the application server 106 to download the selected application to the mobile device 130. The mobile device 130, once it receives the application, may install the application and update the on-device application catalog 150 to reflect that applications availability.

In another example, a user of one mobile device may select an application from the application catalog of the catalog server and choose to send it to a different mobile device. For example, a user of mobile device 130 may browse the application catalog 145 of the catalog server 105 and select an application to download on another mobile device 135. That is, the user of an originating device such as mobile device 130, while browsing the application catalog 145 of the catalog server 105, may select an application, and select a "Send-to-a-Friend" option presented by the catalog server 105. The catalog server 105 may then query the user of the originating device 130 for information identifying the destination device such as mobile device 135. The identifying information may include information such as the phone number, user name, IP address, or other unique identifying information of the destination device or "friend." Additionally, more than one destination device may be indicated. The catalog server 105 then generates a push message to the destination device 135 to notify the destination device 135 of the availability of the application. If the push message is acknowledged or the application is accepted by the destination device 135, the application may be downloaded from the application server 106 to the destination device 135. In this manner, one mobile device may initiate a download of an application to a different mobile device. It should be noted that, the destination device 135 may belong to the same individual that owns the originating device 130 or another individual.

In another example, the "Send-to-a-Friend" option may be invoked on a mobile device 130 while browsing the on-device application catalog 150. For example, a user of mobile device 130, while browsing the on-device application catalog 150 of that mobile device 130 may select one of the applications from the on-device application catalog 150. The user may then select a "Send-to-a-Friend" option through the user interface of the mobile device 130. Then, similar to the example above for the catalog server, the mobile device 130 may then query the user for information identifying the destination device such as mobile device 135. The identifying information may include information such as the phone number, user name, IP address, or other unique identifying information of the destination device or "friend." Additionally, more than one destination device may be indicated. The mobile device 130 then generates a push message to the destination device 135 to notify the destination device 135 of the availability of the application.

In yet another example, a user of a personal computer such as user system 120 or another device connected with the Internet 110 but not the wireless network 125 may browse the application catalog 145 of the catalog server 105 and select an application to download to one of the mobile devices 130-140. Similar to the previous example, a user of user system 120 may browse the application catalog 145 of the catalog server 105 and select an application to download to a mobile device 130. Therefore, in this example the user system 120 is an originating device rather than mobile device 130 as in the previous example. While browsing the application catalog 145 of the catalog server 105 the user of the user system 120 may select an application and select a "Send-to-a-Friend" option presented by the catalog server 105. The catalog server 105 then queries the user system 120 for information identifying one or more destination devices such as mobile device 130. The catalog server 105 then generates a push message to the destination device 130 to notify the destination device 130 of the availability of the application. If the application is accepted by the destination device 130, the application may be downloaded from the application server 106 to the destination device 130. In this manner, a system that is not connected with the wireless network may initiate a download of an application to a mobile device. The user of the user system 120 may be the owner of the destination device 130 or another individual.

In yet another example, the catalog server itself may select an application or other content to download to one or more mobile devices. For example, the catalog server may initiate a download in response to an application upgrade becoming available. In such a case, the catalog server 105 may record which mobile devices have downloaded a particular application. Upon an upgrade for that application being added to the application catalog 145 on the catalog server 105, the catalog server 105 may generate a push message to each mobile device that has downloaded that application. When a mobile device receives the push message, the mobile device may accept the message and download the application as described above. Alternatively, mobile device 130 may periodically check the application catalog 145 of the catalog server 105 for available updates to applications in the application catalog 150 of the mobile device 130.

Therefore, by originating a push message, either in response to a request for an application in the application catalog 145 or in response to the occurrence of some other event, the catalog server 105 may notify one or more mobile devices 130-140 of an available application. The push message may include information from the application catalog 145 maintained by the catalog server 105 and related to an available application on the application server 106. The mobile devices 130-140, upon receiving the push message may then use the information from the application catalog 105 of the catalog server 145 to determine whether to download or pull the application from the application server 106. The mobile devices 130-140 then may install the application and update the on-device application catalog 150 to reflect the applications availability on that mobile device.

Also as will be described in greater detail below, each mobile device 130 may provide additional functions related to the on-device application catalog 150. For example, the mobile device 130 may provide a "vault" function that allows the mobile device 130 to select one or more of the applications from the on-device application catalog 150 to be placed into a vault. The vault can be used to store data related to the application such as licensing information, high scores, a user's personal information, etc that may later be used to restore the application. Generally speaking, placing an application into the vault comprises selecting an application from the on-device application catalog 150, selecting a vault function, saving in a vault folder a set of permanent data related to the application, uninstalling the application, and deleting the application. Additional details of the vault function will be described below with reference to FIG. 9.

The mobile device 130 may also provide a search function that utilizes information provided to the on-device application catalog 150 by the catalog server 105. For example, the catalog server 105 may periodically generate a list of categories for available applications such as games, entertainment, productivity, etc. Information related to these categories may be collected from the application catalog 145 on the catalog server 105 and placed into a push message to be sent to one or more mobile devices. The mobile devices may be configured to automatically accept and cache such content. Then, a user of the mobile device may search the contents of these categories and use associated links to download applications from the application server 106. Details of the search function will be discussed below with reference to FIG. 11.

Figure 2:
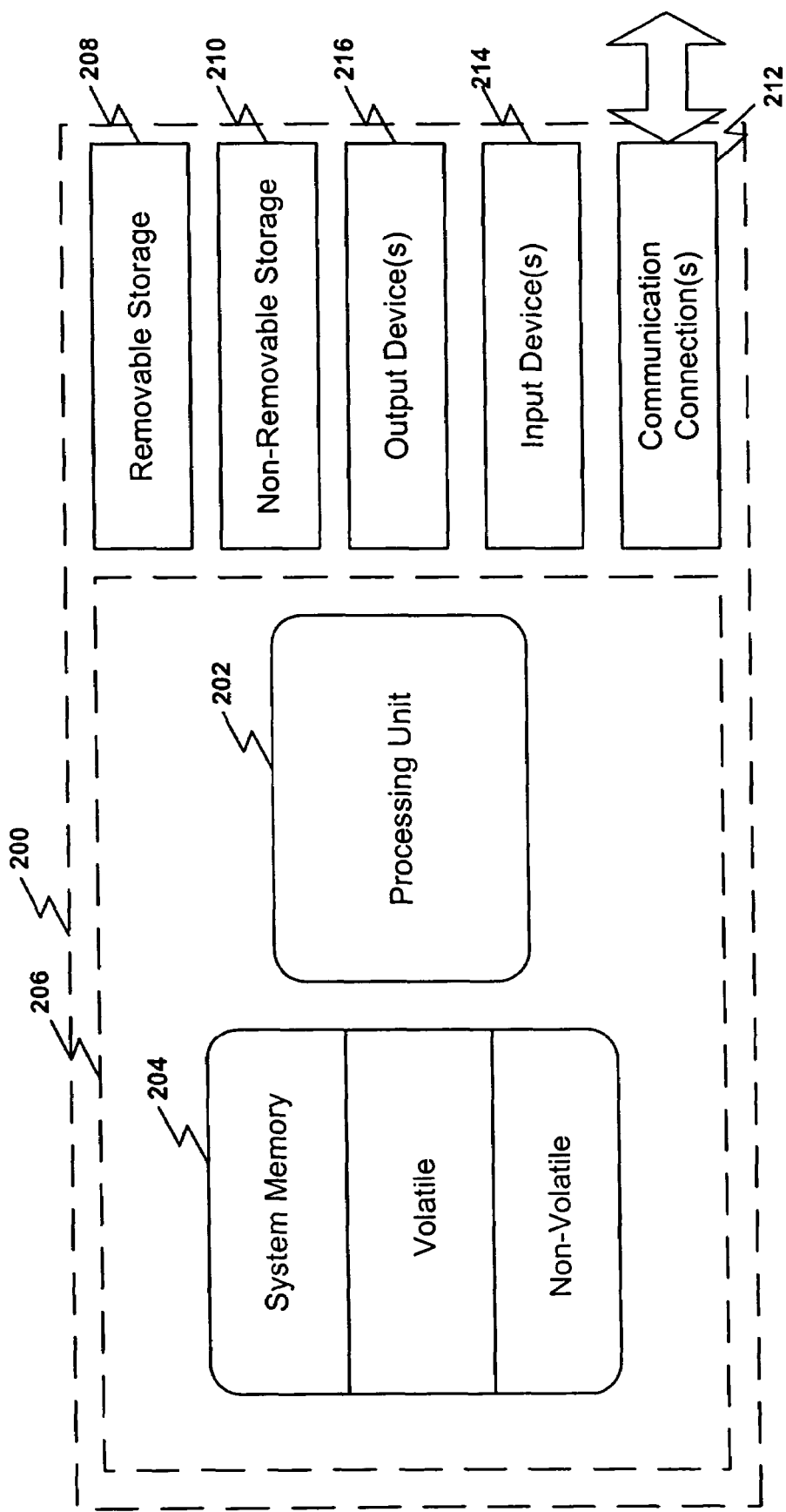
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as a catalog server, application server, a user system or other system. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection(s) 212 that allow the system to communicate with other devices. By way of example, and not limitation, communication connections 212 includes a wired network or direct-wired connection, and wireless connections such as acoustic, RF, and infrared.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

Figure 3:
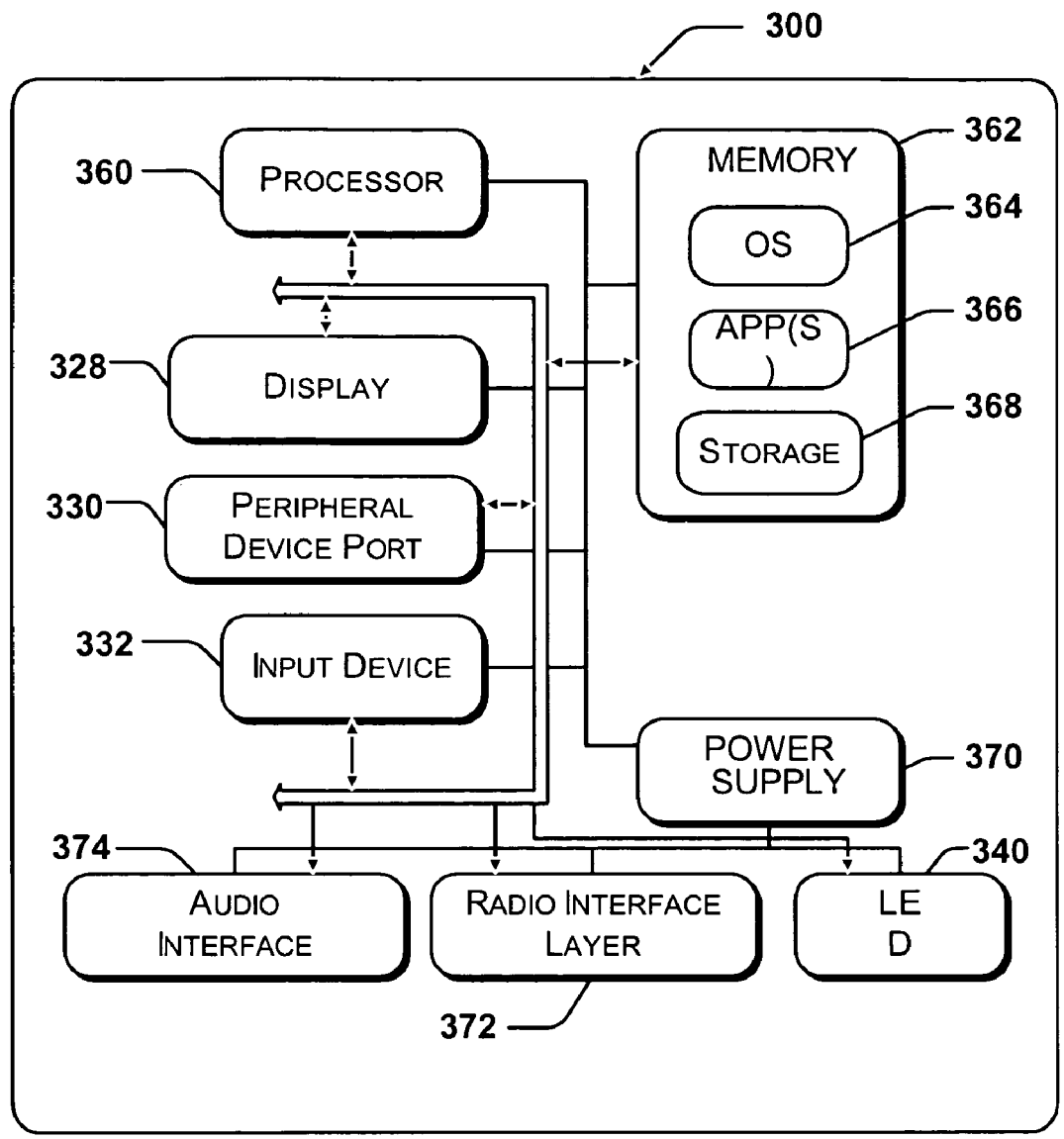
FIG. 3 illustrates an example of a mobile device upon which embodiments of the invention may be implemented.

FIG. 3 illustrates an example of a mobile device upon which embodiments of the invention may be implemented. The mobile device 300 may be a variety of possible devices including a cellular telephone, PDA, pager, or other device capable of communicating over a wireless network.

The mobile device 300 includes a processor 360, a memory 362, a display 328, peripheral device port 330, and an input device 332. The memory 362 generally includes both volatile memory (e.g., RAM) and non-volatile memory (e.g., ROM, Flash Memory, or the like). The mobile device 300 includes an operating system 364, such as the Windows CE operating system from Microsoft Corporation or other operating system, which is resident in the memory 362 and executes on the processor 360. The input device 332 may be a push button numeric dialing pad (such as on a typical telephone), a multi-key keyboard (such as a conventional keyboard), or other type of input device. The display 328 may be a liquid crystal display, or any other type of display commonly used in mobile devices. The display 328 may be touch-sensitive, and would then also act as an input device. The peripheral device port 330 may be of the type to accept additional memory cards, game cards, modem cards, or other peripheral devices.

One or more application programs 366 are loaded into memory 362 and run on the operating system 364. Examples of application programs include phone dialer programs, installation wizard programs, email programs, scheduling programs, PIM (personal information management) programs, word processing programs, spreadsheet programs, Internet browser programs, and so forth. The mobile device 300 also includes non-volatile storage 368 within the memory 362. The non-volatile storage 368 may be used to store persistent information which should not be lost if the mobile device 300 is powered down. The applications 366 may use and store information in the storage 368, such as e-mail or other messages used by an e-mail application, contact information used by a PIM, appointment information used by a scheduling program, documents used by a word processing program, device driver programs, and the like.

The mobile device 300 has a power supply 370, which may be implemented as one or more batteries. The power supply 370 might further include an external power source, such as an AC adapter or a powered docking cradle that supplements or recharges the batteries. The mobile device 300 is also shown with two types of external notification mechanisms: an LED 340 and an audio interface 374. These devices may be directly coupled to the power supply 370 so that when activated, they remain on for a duration dictated by the notification mechanism even though the processor 360 and other components might shut down to conserve battery power. The LED 340 may be programmed to remain on indefinitely until the user takes action to indicate the powered-on status of the device. The audio interface 374 is used to provide audible signals to and receive audible signals from the user. For example, the audio interface 374 may be coupled to a speaker for providing audible output and to a microphone for receiving audible input, such as to facilitate a telephone conversation.

The mobile device 300 also includes a radio interface layer 372 that performs the function of transmitting and receiving radio frequency communications. The radio interface layer 372 facilitates wireless connectivity between the mobile device 300 and the outside world, via a communications carrier or service provider. Transmissions to and from the radio interface layer 372 are conducted under control of the operating system 364. In other words, communications received by the radio interface layer 372 may be disseminated to application programs 366 via the operating system 364, and vice versa.

Figure 4:
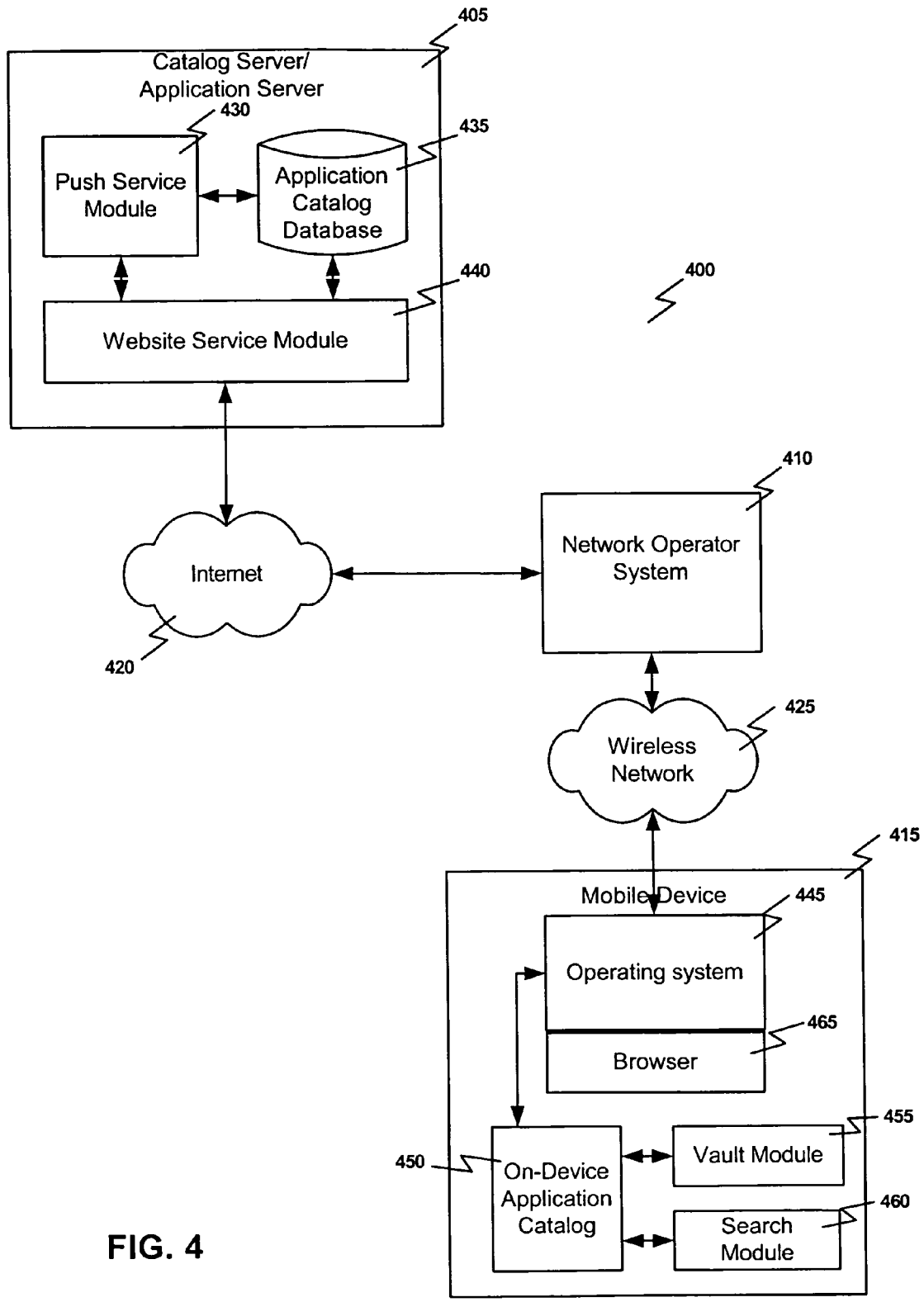
FIG. 4 illustrates components of a system for updating an on-device application catalog according to an embodiment of the present invention.

FIG. 4 illustrates the main functional components of a system for updating an on-device application catalog according to an embodiment of the present invention. This example includes a catalog server/application server 405, a network operator system 410, and a mobile device 415. As explained above, the mobile device 415 is connected with the network operator system 410 via the wireless network 425. The network operator system 410 in turn provides a connection to the Internet 420 through which the mobile device may communicate with the catalog server/application server 405.

In this example, the catalog server and application server are illustrated as a combined unit. As discussed above, the catalog server and application server may be one physical machine or a plurality of machines depending upon the implementation. The catalog server/application server 405 comprises an application catalog database 435, a push service module 430, and a website service module 440. The application catalog database 435, as introduced above, contains information related to the applications that are currently available on that catalog server/application server 405. For example, the application catalog 435 may contain information such as title, author, a brief description, reviews, cost, a thumbnail screenshot, etc. Additionally, the files containing each application, such as the executable file or a compressed file containing the executable, may also be stored in the application catalog database 435. Alternatively, the files containing each application may be stored in another database within the catalog server/application server 405 or even external to but accessible by the catalog server/application server 405.

The website service module 440 of the catalog server/application server 405 provides a number of web pages through which the application catalog database 435 may be accessed. That is, through one or more web pages presented by the website service module 440 a user of a mobile device or other system connected with the catalog server/application server 405 via the Internet 420 may browse, search, or perform other functions using the application catalog database 435. For example, one web page presented by the website service module 440 may present a list of categories for applications in the application catalog database 435. Another web page may provide for a search of the application catalog database 435 using a keyword. One or even all of the pages may provide a "Send-to-a-Friend" option to send information about an application to one or more mobile devices.

The push service module 430 of the catalog server/application server 405 may generate push messages to the mobile device 415 to initiate a download of an application from the application catalog database 435. As discussed above, the catalog server/application server 405 may receive a request for an application in a variety of ways. For example, the request may be automatically generated by the catalog server itself in response to some event happening. In other cases, a request may be received from a mobile device or other device accessing the application catalog database 435 via the website service module 440. Once the request for an application has been received, the push service module 430 generates a push message based on the request and containing information from the application catalog database 435. For example, the push message may include a destination phone number, user name, address and/or other information collected from the request as well as an application title, description, cost, thumbnail, etc. collected from the application catalog database 435. Once the push service module has generated the push message, it sends the message to the network operator system 410 through the website service module 440 and Internet 420.

The network operator system 410 routes the push message to the mobile device 415 or devices for which it is intended. For example, the network operator system 410 may read the phone number or other identifying information in the push message in order to identify and location the mobile device 410 to which that message is addressed. The network operator system 410 may then transmit the push message over the wireless network 425 to the mobile device 415.

The mobile device 415 comprises an operating system 445, a browser 465, an application catalog 450, a vault module 455 and a search module 460. The operating system 445 of the mobile device 445 receives the push message and may notify the user of its receipt. For example, once the push message is received, the operating system 445 may open a window or provide another indication on a user interface of the mobile device 415 with a message that a new application is available. The user may then be allowed to view the information from the application catalog database 435 that was included in the push message by the catalog server/application server 405 and accept or reject the application. If the application is accepted, the operating system 445 will contact the catalog server/application server 405 and download or "pull" the application. Once the download is complete, the operating system 445 may install the application and update the on-device application catalog 450.

The browser 465 that is executed on the operating system 445 of the mobile device 415 allows the user of the mobile device 415 to access the web pages provided by the website service module 440 of the catalog server/application server 405. Through the browser 465 a user of the mobile device 415 may view the contents of the application catalog database 435 and select an application for download. As mentioned above, the catalog server/application server 405, through the web pages presented by the website service module 440 may also allow the user of the mobile device 415 to select a "Send-to-a-Friend" option to cause the push message to be sent to a different mobile device. In this way, one mobile device can initiate a download of an application to a different mobile device or even multiple devices.

The vault module 455 of the mobile device 415 provide a "vault" function that allows the user of the mobile device 415 to select one or more of the applications from the on-device application catalog 450 to be placed into a vault. The vault can be used to store data related to the application such as licensing information, high scores, a user's personal information, etc that may later be used to restore the application to a previous condition. Generally speaking, placing an application into the vault comprises selecting an application from the on-device application catalog 450, selecting a vault function, saving in a vault folder a set of permanent data related to the application, uninstalling the application, and deleting the application. Additional details of the vault function will be described below with reference to FIG. 9.

The search module 460 of the mobile device 415 provides a search function that utilizes information provided to the on-device application catalog 450 by the catalog server/application server 405. For example, the catalog server/application server 405 may periodically generate a list of categories for available applications such as games, entertainment, productivity, etc. Information related to these categories may be collected from the application catalog 435 on the catalog server/application server 405 and placed into a push message to be sent to one or more mobile devices. The mobile devices may be configured to automatically accept and cache such content. Then, a user of the mobile device may search the contents of these categories and use associated links to download applications from the catalog server. Details of the search function will be discussed below with reference to FIG. 11.

Alternatively, rather than browsing and requesting an application from the application catalog database 435 of the catalog server/application server 405, a user of the mobile device 415 may browse and select an application from the on-device application catalog 450. The selected application catalog entry may then be "Sent-to-a-Friend" or other mobile device by the operating system 445 as will be discussed below.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 5:
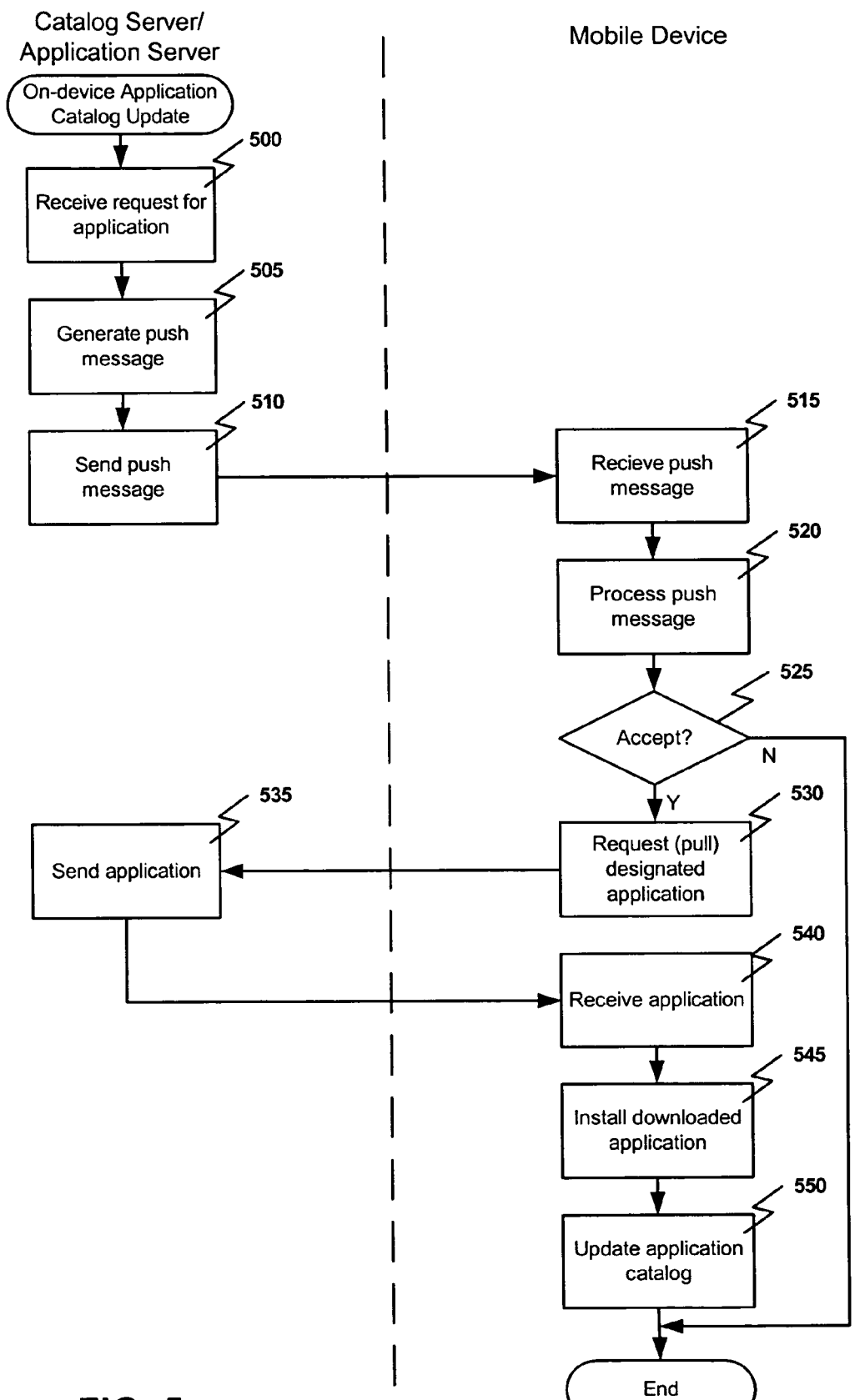
FIG. 5 is a flowchart illustrating updating an on-device application catalog according to an embodiment of the present invention.

FIG. 5 is a flowchart illustrating updating an on-device application catalog according to an embodiment of the present invention. In this example, operation begins with receive operation 500 on the catalog server/application server. As noted above, the catalog server and application server may be implemented separately as well. Receive operation 500 receives a request for an application identified in the application catalog stored on a catalog server. As indicated above, the request for an application may originate in a variety of ways. For example, the catalog server may originate the request in response to the occurrence of some event. Alternatively, the request may be in response to a user selecting a "Send-to-a-Friend" option as will be described below with reference to FIG. 8.

Next, generate operation 505 generates a push message based on the request for the application and containing data from the application catalog stored on the catalog server. For example, the push message may include a destination phone number, user name, address and/or other information collected from the request as well as an application title, description, cost, thumbnail, etc. collected from the application catalog database.

Send operation 510 then sends the push message to one or more mobile devices designated in the request for the application. As discussed above, the catalog server sends the push message to the network operator which in turn transmits the message to the devices via thee wireless network. On the mobile device, receive operation 515 receives the push message from the catalog server via the wireless network.

Next, read operation 520 reads the contents of the push message. Details of read operation 520 will be discussed below with reference to FIG. 7. Generally speaking, read operation 520 reads the application catalog data from the catalog server contained in the push message.

Query operation 525 then determines whether the application indicated by the push message should be accepted. This determination may be based on querying a user of the mobile device or may be made automatically by the mobile deice based on the nature of the push message. For example, if the push message indicates that the application is an upgrade for an application already installed on the mobile device, the mobile device may be configured to accept the application without querying the user. In another example, the device may be configured to pre-cache some content such as a list of the "Top Ten" applications, a list of application categories, or a list of applications based on a set of user preferences. Responsive to determining that the application should not be accepted, operation ends.

However, if a determination is made at query operation 525 that the application should be accepted, request operation 530 sends a request for the application to the catalog server. In other words, the mobile device then pulls the application indicated in the push message.

At the catalog server/application server, upon receiving the pull message from the mobile device, the application server sends or downloads the application. The mobile device receives the application from a catalog server at receive operation 540.

Next, at install operation 545, the mobile device installs the downloaded application. The installation may be initiated automatically upon completion of the download or may be done in response to a user command or acknowledgement of the download. However, in some cases, no installation is performed. For example, if pre-caching some content, the installation may be postponed until a user has a chance to accept or reject the content. Update operation 550 then updates the on-device application catalog to indicate the availability of the application for execution on the mobile device.

Figure 6:
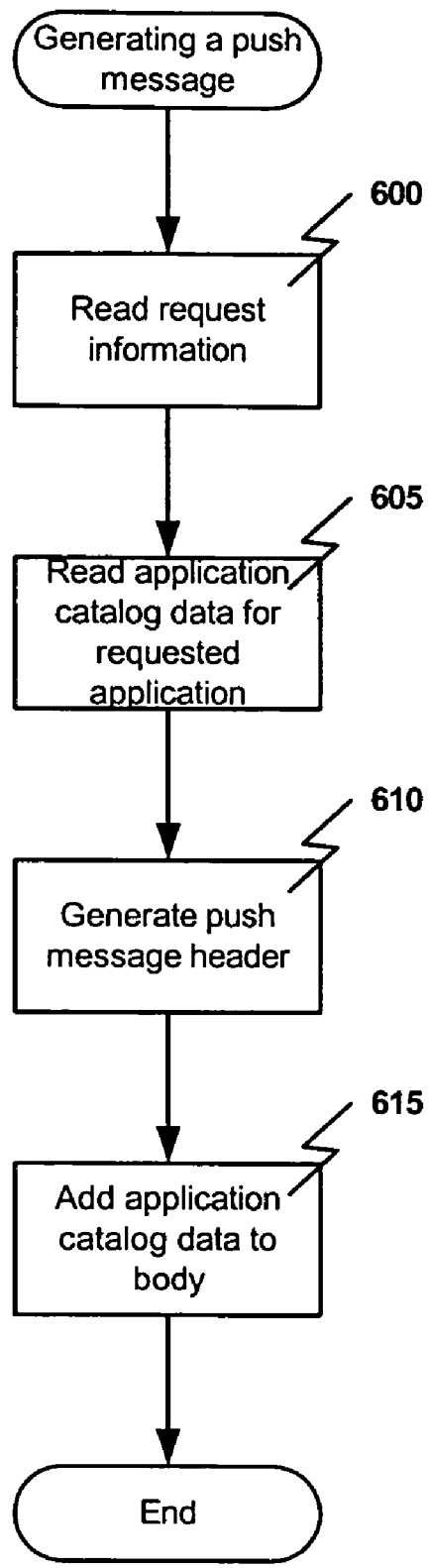
FIG. 6 is a flowchart illustrating generating a push message according to the embodiment illustrated in FIG. 5.

FIG. 6 is a flowchart illustrating generating a push message according to the embodiment illustrated in FIG. 5. These operations may be performed by the catalog server or by a mobile device using the on-device application catalog. Here, operation begins with read operation 600. Read operation 600 reads request information indicating the application and a destination device for the push message. That is, a request for an application, regardless of where or how it originated, may be associated with a specific application. Further, the request also indicates the mobile device to which the push message will be sent. For example, if the request originated from a Send-to-a-Friend function, as will be described below, the user making the request selected an application an provided destination information.

Read operation 605 then reads data from the application catalog related to the application. That is, the entry in the application catalog related to the selected application is read.

Then, generate operation 610 generates a push message header indicating the destination device for the push message. As mentioned previously, the push message may be in many different formats. In some cases, the header of the message contains an indication of the destination mobile device such as a phone number or address. This data, from the request, will be added to the push message.

Add operation 615 then adds the data from the application catalog to a body of the push message. That is, the application catalog data related to the requested application is added to the push message. In some cases all of the application catalog data will be added. In other cases only a portion of the application catalog data is added. In such a case, the mobile device receiving the push message may later read additional data as needed.

Figure 7:
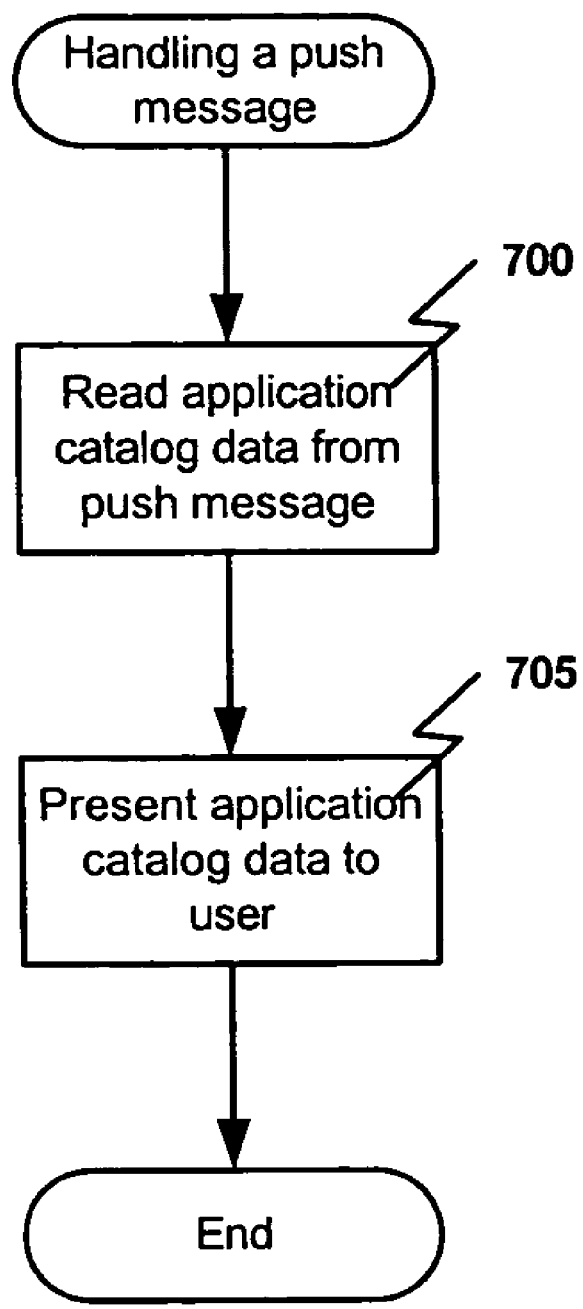
FIG. 7 is a flowchart illustrating handling a push message according to the embodiment illustrated in FIG. 5.

FIG. 7 is a flowchart illustrating handling a push message according to the embodiment illustrated in FIG. 5. Here, operation begins with read operation 700. Read operation 700 reads the information from the application catalog contained in the push message. That is, read operation 700 reads the application catalog data from the catalog server or on-device application catalog of another mobile device that was added to the push message.

Next, optional notification operation 705 presents the information from the application catalog read from the push message to a user of the mobile device for acceptance. That is, notification operation may open a window or provide another indication on a user interface of the mobile device with a message that a new application is available. The user may then be allowed to view the information that was included in the push message by the catalog server or other mobile device. Alternatively, the mobile device may be configured to accept some or all applications without notifications. For example, upgrades to previously installed application or information to be pre-cahced may be automatically accepted without any notification.

Figure 8:
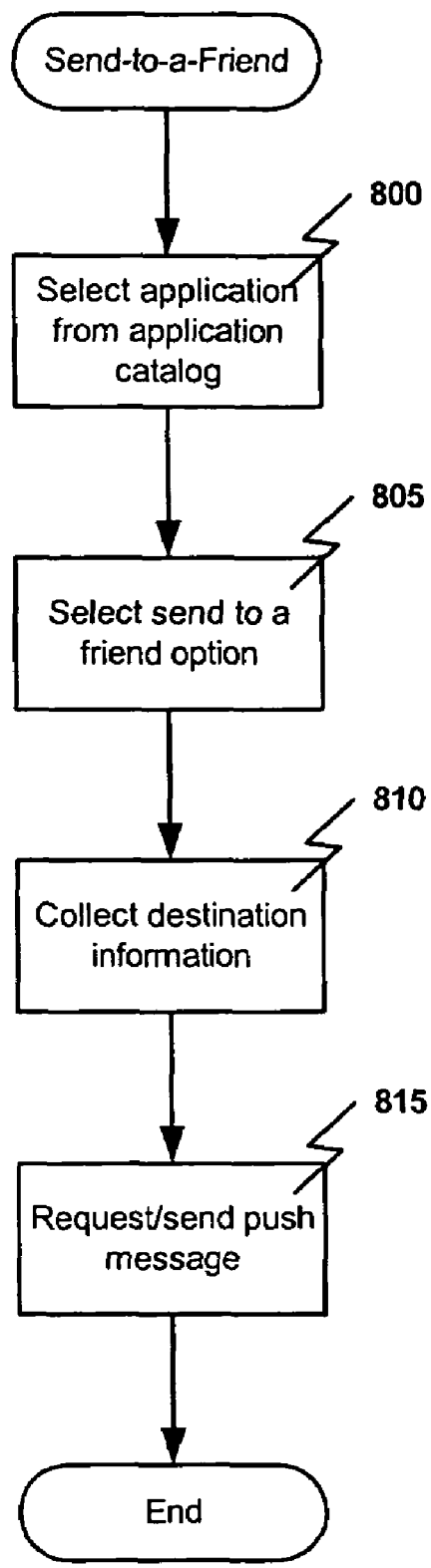
FIG. 8 is a flowchart illustrating a "Send-to-a-Friend" feature for updating an on-device application catalog according to an embodiment of the present invention.

FIG. 8 is a flowchart illustrating a "Send-to-a-Friend" feature for updating an on-device application catalog according to an embodiment of the present invention. These operations may be performed by the catalog server or by a mobile device to send information from an application catalog database on the catalog server or an on-device application catalog on the mobile device. In this example, operation begins with select operation 800. Select operation 800 receiving an indication of a selected application to be downloaded. That is, a user viewing a web page presented by the catalog server or the on-device application catalog of the user's mobile device may select an application from the application catalog by clicking a link, checking a checkbox, or manipulating some other type of control.

Next, select operation 805 receives an indication of selection of a send-to-a-friend option. As mentioned above, the web pages presented by the catalog server for browsing, searching, or viewing the application catalog or the user interface of the mobile device may include a link, button, or other control for selecting a "Send-to-a-Friend" option. Select operation 805 detects the selection of such a control.

Collect operation 810 collects destination information for the selected application to be downloaded. This collection may be performed by querying the user for information regarding the destination. For example, identifying information related to the destination mobile device such as a phone number, address, user name or other unique, identifying information may be collected through a form presented on a web page or through one or more pop-up windows, or in another manner.

Figure 9:
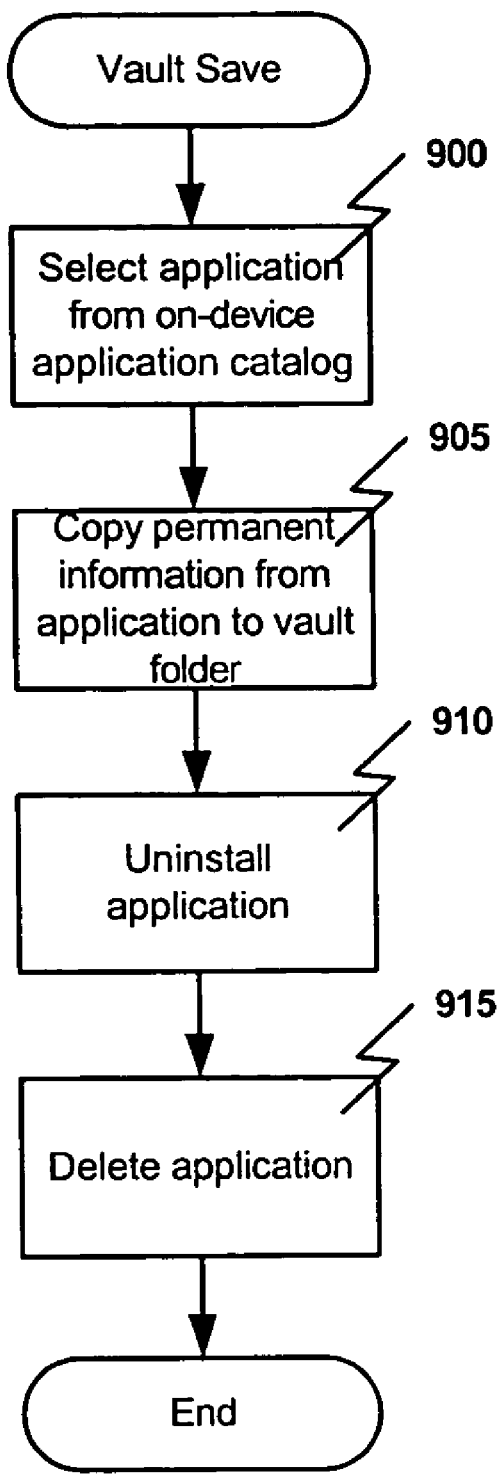
FIG. 9 is a flowchart illustrating a "vault" feature for saving an application in an on-device application catalog according to an embodiment of the present invention.

Then, request/send operation 815 generates a request for the application through the catalog server or generates and sends a push message from the mobile device. That is, a message is generated, a routine is executed, a call is made, or in another way the catalog server is signaled that a request for an application has been received. This in turn may trigger the application download and updating of an on-device application catalog as described above with reference to FIG. 5. In other words, the catalog server generates a push message to the destination mobile device. If performed on a mobile device rather than a catalog server, the mobile device generates and sends the push message to the other mobile device FIG. 9 is a flowchart illustrating a "vault" feature for saving an application in an on-device application catalog according to an embodiment of the present invention. In this example, operation begins with select operation 900. Select operation 900 receives a selection of an application from the on-device application catalog. That is, the user of the mobile device selects from the on-device application catalog one or more of the applications to be moved to the vault.

Copy operation 905 then copies permanent information from the selected application to a vault folder. That is, information related to the application that a user may wish to retain such as licensing information, high scores for games, set up information, etc. is copied to the vault. Also copied to the vault is a link to the original application on the catalog server. This link may later be used to download the application if the user chooses to reinstall the application. In some cases, the vault folder may be part of the on-device application catalog or may be located in an application catalog database on a catalog server. That is, copying permanent information from the selected application to the vault folder may include sending that application to the catalog server. This allows information from the vault to be restored to a replacement mobile device in the event an original mobile device is lost or destroyed. Information to be saved in the vault folder may be configurable per application. That is, the application may, through various means, identify information to be saved. Alternatively, a comparison of the current files and keys for the application may be compared to an install manifest set when the application was first installed to determine which files and keys have changed. The changed files and keys may then be identified as those to be saved in the vault folder.

Once the selected information is copied to the vault folder, uninstall operation 910 uninstalls the selected application and delete operation 915 deletes the application. In this way, an application selected from the on-device application catalog may be removed from the mobile device while retaining a set of permanent information. Then, if a user chooses to reinstall the application, operation may continue as shown in FIG. 10.

Figure 10:
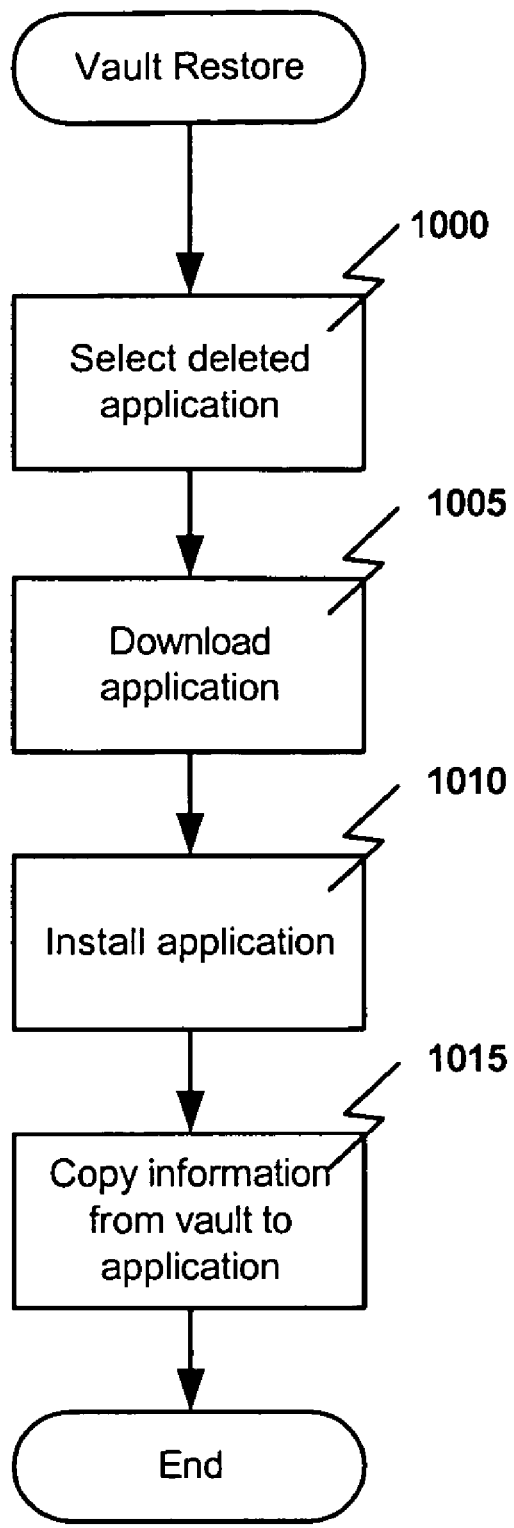
FIG. 10 is a flowchart illustrating a vault feature for restoring an application in an on-device application catalog according to an embodiment of the present invention.

FIG. 10 is a flowchart illustrating a vault feature for restoring an application in an on-device application catalog according to an embodiment of the present invention. Here operation begins with select operation 1000. Select operation 1000 receives a selection of a deleted application from the vault portion of the on-device application catalog. That is, while the application has been deleted, it may still be listed in the application catalog as "available." Alternatively, deleted applications may be listed separate from the rest of the on-device application catalog or even listed as part of an application catalog database on a catalog server. Regardless of exactly how the applications are presented to the user, the user selects the application to be reinstalled.

Download operation 1005 then downloads the selected application from the application server. Since the link to the application was saved in the vault, the mobile device can locate and download the application from the application server.

Next, install operation 1010 installs the application downloaded from the application server and copy operation 1015 copies the permanent information from the vault folder to the application. In this way, the application is restored to the same conditions it was in prior to the application being deleted.

As mentioned above, a catalog server may periodically, or in response to some event, generate and send a push message to one or more mobile devices. In some cases, the catalog server may automatically generate a push message containing a list of categories for applications stored in the application catalog of the catalog server. In this way, information may be pre-cached on the mobile device in the on-device application catalog. This pre-cached information may then be conveniently used to search or browse rather than repeated accessing the catalog server application catalog. Pre-cached information may include a list of categories for available applications, a list of popular applications such as a "Top Ten" list, a list of new or recently added applications, a list of highlighted applications based on preferences of the user determined by his past downloads, etc. This information can then be used for an expedited search.

Figure 11:
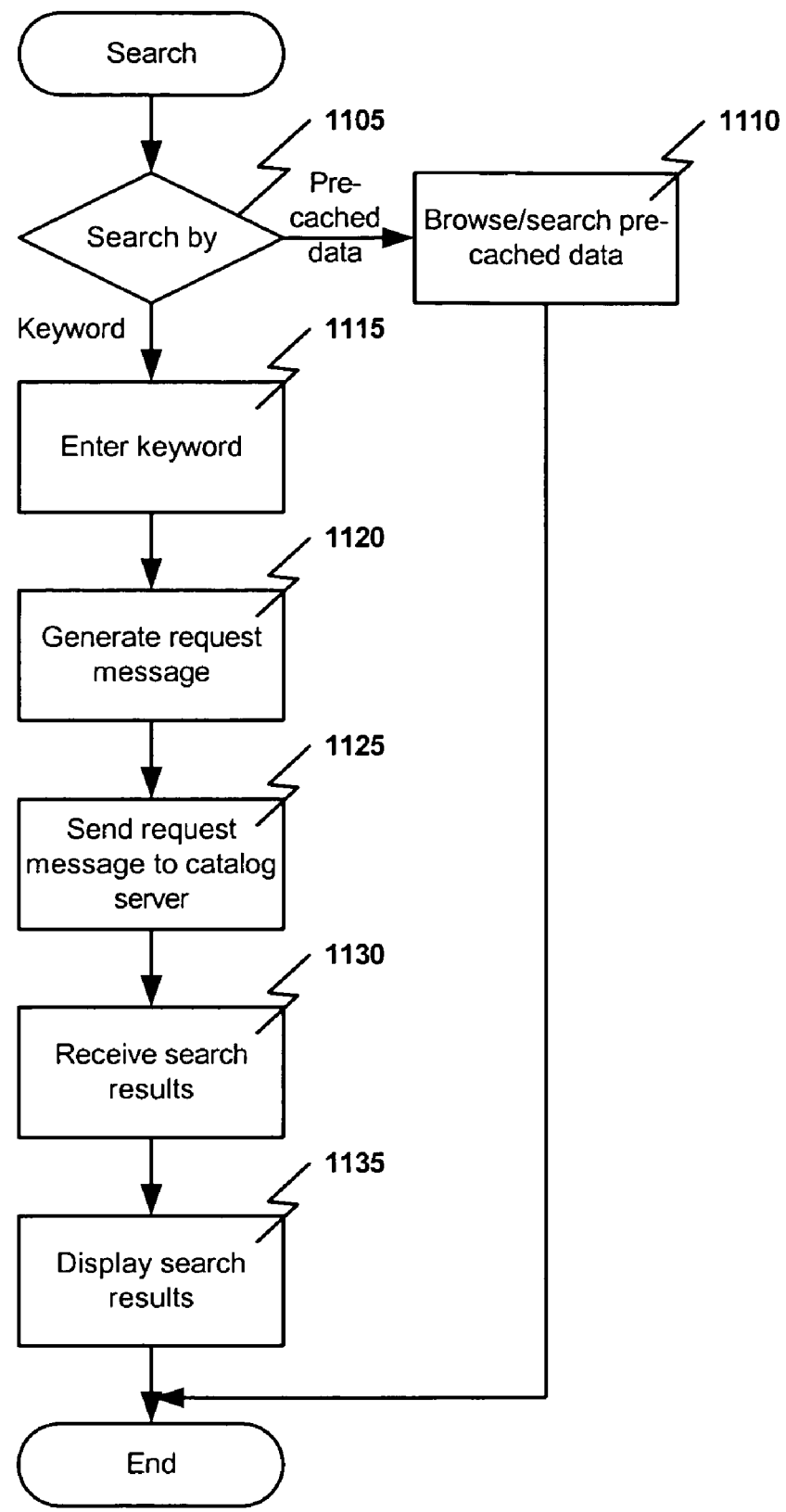
FIG. 11 is a flowchart illustrating a search feature for use in connection with an on-device application catalog according to an embodiment of the present invention.

FIG. 11 is a flowchart illustrating a search feature for use in connection with an on-device application catalog according to an embodiment of the present invention. Here, operation begins with query operation 1105. Query operation 1105 makes a determination as to whether to a search is to be performed based on pre-cached data or by one or more keywords. This determination may be made based on user input such as a user selecting a menu item. If a determination is made to search pre-cached data, search operation 1110 browses or searches the pre-cached data of the on-device application catalog.

Alternatively, if a keyword search is selected, a search of the catalog server application catalog is performed in operations 1115-1135. These operations include input operation 1115 that receives a keyword or words from a user. A request message or query string is generated using the keyword(s) at generate operation 1020. Next, at send operation 1025, the request is sent to the catalog server. Receive operation 1030 receives search results from the catalog server and the results are displayed at display operation 1035.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of providing software applications to a mobile device comprising:
    storing an application catalog in memory on a catalog server, the application catalog comprising information relating to a plurality of applications available on an application server for download;
    providing access to the application catalog stored on the catalog server;
    receiving from a browser a request for an application that is one of the plurality of applications identified in the application catalog, wherein the request identifies the mobile device;
    reading request information from the request, the request information indicating the application and the mobile device;
    reading data from the application catalog related to the application;
    generating a push message with a header indicating the mobile device;
    adding the data from the application catalog to the body of the push message;
    sending the push message to the mobile device identified in the request;
    receiving an acceptance of the push message from the mobile device; and
    responsive to receiving the acceptance, sending the application from the application server to the mobile device for storing on the mobile device to provide additional functionality to the mobile device.

2. The method of claim 1, further comprising prior to receiving a request for an application:
    receiving an indication of a selected application to be downloaded;
    receiving an indication of selection of a send-to-a-friend option;
    collecting destination information for the selected application to be downloaded; and
    generating a request for the application.

3. A computer-storage medium encoding a computer program of instructions for executing a computer process for performing the operations of claim 1.

4. The computer-storage medium of claim 3, further comprising prior to receiving a request for an application:
    receiving an indication of a selected application to be downloaded;
    receiving an indication of selection of a send-to-a-friend option;
    collecting destination information for the selected application to be downloaded; and
    generating a request for the application.

5. A method of updating an on-device-application catalog in a mobile device comprising:
    receiving a first push message from a catalog server including application catalog data from an application catalog, the application catalog comprising information relating to a plurality of applications available on an application server for download;
    pre-caching on the mobile device the application catalog data from the catalog server contained in the first push message;
    responsive to receiving an indication of a search function, browsing the application catalog data from the catalog server;
    accessing the application catalog stored on the catalog server with a browser;
    receiving a second push message from the application catalog server indicating availability of an application for download and containing information from the application catalog related to the application;
    reading the information from the second push message;
    displaying the information from the second push message to a user of the mobile device for acceptance;
    receiving an indication that the user of the mobile device accepts the application; and
    in response to the receiving the indication:
        requesting the application from the application server,
        receiving the application from the application server,
        installing the application on the mobile device,
        updating the on-device application catalog to indicate the availability of the application for execution on the mobile device, and
        displaying an indication of the availability of the application for execution on the mobile device.

6. The method of claim 5, further comprising:
    receiving a selection of an application from the on-device application catalog;
    copying permanent information from the selected application to a vault folder;
    uninstalling the selected application; and deleting the selected application.

7. The method of claim 6, further comprising:
    receiving a selection of a deleted application from the on-device application catalog;
    downloading the application from the catalog server;
    installing the application; and copying the permanent information from the vault folder to the application.

8. A computer-storage medium encoding a computer program of instructions for executing a computer process for performing the operations of claim 5.

9. The computer-storage medium of claim 8, further comprising:
    receiving a selection of an application from the on-device application catalog;
    copying permanent information from the selected application to a vault folder;
    uninstalling the selected application; and deleting the selected application.

10. The computer-storage medium of claim 9, further comprising:
    receiving a selection of a deleted application from the on-device application catalog;
    downloading the application from the catalog server;
    installing the application; and copying the permanent information from the vault folder to the application.

11. A system for providing software applications to a mobile device comprising:
    a processor; and
    a memory, coupled with and readable by the processor, the memory containing a series of instructions that, when executed by the processor, cause the processor to:
        provide access to an application catalog stored on a catalog server, the application catalog comprising information relating to a plurality of applications available on an application server for download, receive from a browser a request for an application that is one of the plurality of applications identified in the application catalog, wherein the request identifies the mobile device, read request information from the request, the request information indicating the application and the mobile device;

read data from the application catalog related to the application;

generate a push message with a header indicating the mobile device;

add the data from the application catalog to the body of the push message;

send the push message to the mobile device identified in the request for the application, receive an acceptance of the push message from the mobile device, and responsive to the receiving the acceptance, send the application to the mobile device for storing on the mobile device to provide additional functionality to the mobile device.

12. The system of claim 11, further comprising prior to receiving a request for an application:

receiving an indication of a selected application to be downloaded;

receiving an indication of selection of a send-to-a-friend option;

collecting destination information for the selected application to be downloaded; and generating a request for the application.

13. A mobile device for updating an on-device application catalog comprising:

a processor; and a memory, coupled with and readable by the processor, the memory containing a series of instructions that, when executed by the processor, cause the processor to:

receive a first push message from a catalog server including application catalog data from an application catalog, the application catalog comprising information relating to a plurality of applications available on an application server for download;

pre-cache on the mobile device the application catalog data from the catalog server contained in the first push message;

responsive to receiving an indication of a search function, browse the application catalog data from the catalog server;

access the application catalog stored on a catalog server with a browser, receive a second push message from the application catalog server indicating availability of an application for download and containing information from the application catalog related to the application, read the information from the second push message, display the information from the second push message to a user of the mobile device for acceptance, and receive an indication that the user of the mobile device accepts the application, responsive to receiving the indication:

request the application from the application server, receive the application from the application server, install the application on the mobile device, update the on-device application catalog to indicate the availability of the application for execution on the mobile device, and display an indication of the availability of the application for execution on the mobile device.

14. The mobile device of claim 13, further comprising:

receiving a selection of an application from the on-device application catalog;

copying permanent information from the selected application to a vault folder;

uninstalling the selected application; and deleting the selected application.

15. The mobile device of claim 14, further comprising:

receiving a selection of a deleted application from the on-device application catalog;

downloading the application from the catalog server;

installing the application; and copying the permanent information from the vault folder to the application.

* * * * *